(12) United States Patent
Stallmann

(10) Patent No.: US 9,945,607 B2
(45) Date of Patent: Apr. 17, 2018

(54) CRYOGENIC $CO_2$ SEPARATION USING A REFRIGERATION SYSTEM

(71) Applicant: ALSTOM Technology Ltd, Baden (CH)

(72) Inventor: Olaf Stallmann, Essenheim (DE)

(73) Assignee: General Electric Technology GmbH, Baden (CH)

(*) Notice: Subject to any disclaimer, the term of this patent is extended or adjusted under 35 U.S.C. 154(b) by 764 days.

(21) Appl. No.: 14/041,183

(22) Filed: Sep. 30, 2013

(65) Prior Publication Data

US 2014/0026613 A1 Jan. 30, 2014

Related U.S. Application Data

(63) Continuation of application No. PCT/IB2012/000602, filed on Mar. 27, 2012.

(30) Foreign Application Priority Data

Mar. 30, 2011 (EP) .................................. 11160439

(51) Int. Cl.
*F25J 1/00* (2006.01)
*F25J 3/00* (2006.01)
(Continued)

(52) U.S. Cl.
CPC ............ *F25J 3/067* (2013.01); *B01D 53/002* (2013.01); *B01D 53/62* (2013.01); *F25J 1/027* (2013.01); *B01D 53/501* (2013.01); *B01D 2251/404* (2013.01); *B01D 2251/606* (2013.01); *B01D 2256/22* (2013.01); *B01D 2257/2045* (2013.01); *B01D 2257/302* (2013.01); *B01D 2257/404* (2013.01); *B01D 2257/504* (2013.01); *B01D 2258/0283* (2013.01); *F23J 2215/50* (2013.01); *F23J 2219/70* (2013.01);
(Continued)

(58) Field of Classification Search
CPC ...... F25J 3/067; F25J 2215/80; F25J 2220/80; F25J 2220/68; F25J 2270/16; F25J 2270/18; B01D 53/62; B01D 2256/22; B01D 2258/0283; Y02C 10/12
See application file for complete search history.

(56) References Cited

U.S. PATENT DOCUMENTS 3,643,451 A 2/1972 Foucar
3,754,405 A 8/1973 Rosen
(Continued)

FOREIGN PATENT DOCUMENTS

EP 2 023 066 2/2009
FR 2 821 351 8/2002
(Continued)

*Primary Examiner* — Keith Raymond
(74) *Attorney, Agent, or Firm* — GE Global Patent Operation; Cynthia W. Flanigan

(57) ABSTRACT

A refrigeration system for condensation of carbon dioxide ($CO_2$) in a flue gas stream, the system includes a refrigeration circuit, a flue gas treatment system that includes a flue gas compressor, a flue gas adsorption drier, and a refrigeration system for condensation of $CO_2$; and a method for condensation of $CO_2$ in a flue gas stream using a circulating stream of an external refrigerant.

15 Claims, 4 Drawing Sheets

(51) Int. Cl.
*F25J 3/06* (2006.01)
*F25J 1/02* (2006.01)
*B01D 53/00* (2006.01)
*B01D 53/62* (2006.01)
*B01D 53/50* (2006.01)

(52) U.S. Cl.
CPC .. *F23J 2900/15061* (2013.01); *F25J 2205/66* (2013.01); *F25J 2210/70* (2013.01); *F25J 2220/82* (2013.01); *F25J 2230/30* (2013.01); *F25J 2235/80* (2013.01); *F25J 2270/12* (2013.01); *F25J 2270/60* (2013.01); *F25J 2270/902* (2013.01); *Y02C 10/04* (2013.01); *Y02C 10/12* (2013.01)

(56) References Cited

U.S. PATENT DOCUMENTS

| | | | |
|---|---|---|---|
| 4,072,485 A | 2/1978 | Becdelievre et al. | |
| 4,846,862 A | 7/1989 | Cook | |
| 5,233,837 A | 8/1993 | Callahan | |
| 5,651,271 A | 7/1997 | Fraysse et al. | |
| 5,979,177 A * | 11/1999 | Sumner | C07C 7/04 62/612 |
| 6,035,662 A * | 3/2000 | Howard | F25J 3/0223 62/617 |
| 6,301,927 B1 | 10/2001 | Reddy | |
| 6,477,859 B2 | 11/2002 | Wong et al. | |
| 7,766,999 B2 | 8/2010 | Ha | |
| 7,819,951 B2 | 10/2010 | White et al. | |
| 2008/0173585 A1 | 7/2008 | White et al. | |
| 2012/0009109 A1* | 1/2012 | Wright | B01D 53/75 423/239.1 |

FOREIGN PATENT DOCUMENTS

| | | |
|---|---|---|
| FR | 2 884 305 | 10/2006 |
| JP | H0699034 A | 4/1994 |
| KR | 10-0454442 | 10/2004 |
| RU | 2008144568 A | 5/2010 |
| SU | 998820 A1 | 2/1983 |
| WO | 2010/043859 | 4/2010 |
| WO | 2010/070226 | 6/2010 |

* cited by examiner

# CRYOGENIC CO₂ SEPARATION USING A REFRIGERATION SYSTEM

CROSS-REFERENCE TO RELATED APPLICATIONS

This application claims priority to PCT/IB2012/000602 filed Mar. 27, 2012, which in turn claims priority to European application 11160439.3 filed Mar. 30, 2011, both of which are hereby incorporated in their entireties.

TECHNICAL FIELD

The present invention relates to a method and a system for separating $CO_2$ from a $CO_2$ rich flue gas stream by refrigeration of the flue gas stream to condense $CO_2$ present therein.

BACKGROUND

In the combustion of a fuel, such as coal, oil, peat, waste, etc., in a combustion plant, such as a power plant, a hot process gas is generated, such process gas containing, among other components, carbon dioxide $CO_2$. With increasing environmental demands various processes for removing carbon dioxide from the process gas have been developed.

$CO_2$ capture often comprises cooling, or compression and cooling, of the flue gas to condense $CO_2$ in liquid or solid form and separate it from non-condensable flue gas components, such as $N_2$ and $O_2$. Prior to $CO_2$ capture, it is generally necessary to clean the carbon dioxide rich flue gas. Gas cleaning operation may generally include removal of dust, sulfur compounds, metals, nitrogen oxides, etc.

Cooling of the flue gas to its condensation temperature may be achieved by various means, e.g. using a suitable external refrigerant. $CO_2$ capture systems using an external refrigerant can be expensive, both in terms of investment costs and in terms of operational costs. As an alternative, autorefrigeration systems are often used, wherein the $CO_2$ rich flue gas is compressed, cooled and expanded to achieve condensation of the $CO_2$. In these systems the liquid $CO_2$ product is used as a cooling medium for the $CO_2$ rich flue gas. Because of the tight temperature approaches between the condensing and evaporating media in these systems, $CO_2$ condensation must generally be done using brazed aluminum heat exchangers. Besides being expensive, aluminum is sensitive to fouling by many of the trace components contained in flue gases from fossil fuel combustion like mercury and particulate matter. Autorefrigeration systems therefore generally require extensive efforts to remove harmful components in the flue gas upstream of the $CO_2$ condensation step, such as particle filters, mercury adsorbers, and $SO_X/NO_X$ scrubbers.

SUMMARY

An object of the present invention is to provide a system and a method for removal of carbon dioxide from a flue gas stream, e.g. generated in a boiler combusting a fuel in the presence of a gas containing oxygen, the system and method alleviating at least one of the above mentioned problems.

The systems and methods for removal of carbon dioxide from a flue gas stream according to the various aspects described herein allow for cost effective $CO_2$ separation using simple, robust heat exchanger designs and materials.

According to aspects illustrated herein, there is provided a refrigeration system for condensation of carbon dioxide ($CO_2$) in a flue gas stream, said system comprising
a refrigeration circuit containing a refrigerant, said refrigeration circuit comprising
a multistage refrigerant compressor,
a refrigerant condenser,
a refrigerant chiller,
a flue gas chiller,
a first $CO_2$ condenser,
a second $CO_2$ condenser,
wherein the multistage refrigerant compressor is configured to compress the refrigerant from the flue gas chiller, first $CO_2$ condenser and second $CO_2$ condenser to a pressure P0, the refrigerant condenser is configured to condense the compressed refrigerant, the refrigerant chiller is configured to chill at least a portion of the condensed refrigerant using liquid $CO_2$ separated in the first and/or second $CO_2$ condenser, the flue gas chiller is configured to chill the flue gas stream using a first portion of the chilled condensed refrigerant at a first expansion pressure P1 which is lower than P0, the first $CO_2$ condenser is configured to condense and separate a first portion of $CO_2$ from the chilled flue gas stream using a second portion of the chilled condensed refrigerant at a second expansion pressure P2 which is lower than P1, the second $CO_2$ condenser is configured to condense and separate a second portion of $CO_2$ from the chilled flue gas stream using a third portion of the chilled condensed refrigerant at a third expansion pressure P3 which is lower than P2.

The refrigeration system comprises a refrigerant chiller configured to chill at least a portion of the condensed refrigerant using liquid $CO_2$ separated in the first and/or second $CO_2$ condenser. Conventional refrigeration cycles foresee condensation of the refrigerant at the conditions given by the external coolant (e.g. cooling water). This may lead to a high vapor fraction when the refrigerant is expanded to the pressure level corresponding to a defined temperature, since the change in latent heat during adiabatic expansion equals the heat of vaporization for the resulting vapor fraction. This vapor fraction adds only little to the refrigeration duty, but has to be compressed in the refrigerant compressor and condensed in the refrigerant condenser. The refrigeration systems described herein allow for the residual vapor fraction to be minimized by a high degree of heat integration of the cold sources in the systems. Having a high enough $CO_2$ concentration in the feed flue gas, $CO_2$ yields of more than 90% can be achieved.

According to some embodiments, the refrigeration circuit further comprises
a first auxiliary refrigerant chiller configured to further chill the second portion of the chilled condensed refrigerant using liquid $CO_2$ separated in the first $CO_2$ condenser, before the refrigerant is used in the first $CO_2$ condenser,
and/or
a second auxiliary refrigerant chiller configured to further chill the third portion of the chilled condensed refrigerant using liquid $CO_2$ separated in the second $CO_2$ condenser, before the refrigerant is used in the second $CO_2$ condenser.
The first and/or second auxiliary refrigerant chillers maximize the recovery of cold from the liquid $CO_2$ separated in the first and/or second $CO_2$ condenser.

According to some embodiments, each portion of refrigerant from the flue gas chiller, the first $CO_2$ condenser and the second $CO_2$ condenser respectively, are subsequently fed to a suitable compression stage of the multistage refrigerant compressor and recompressed to pressure P0.

According to some embodiments, the refrigeration circuit further comprises a heat exchanger configured to cool at least a portion of the condensed refrigerant using the $CO_2$ depleted flue gas from the second $CO_2$ condenser.

It has been found that the cold $CO_2$ depleted flue gas from the second $CO_2$ condenser may advantageously be used for precooling the condensed refrigerant coming from the refrigerant condenser, before it is chilled in the refrigerant chiller and/or auxiliary refrigerant chillers.

The refrigeration system may be incorporated into a flue gas treatment system for removing $CO_2$ from a flue gas stream, e.g. a flue gas stream generated in a boiler combusting a fuel in the presence of a gas containing oxygen. Incorporating the refrigeration system into a flue gas treatment system for removing $CO_2$ from a flue gas stream allows for a high degree of heat integration of the cold sources in the system, which may provide significant overall energy savings in the system.

Two important factors in order to achieve efficient $CO_2$ condensation in a flue gas treatment system using a refrigeration system as described herein are the (a) pressure of the $CO_2$ rich flue gas stream and (b) the water vapor content of the $CO_2$ rich flue gas stream.

The $CO_2$ rich flue gas stream to be subjected to $CO_2$ condensation should preferably be at a pressure, at which gaseous $CO_2$ in the flue gas is converted to liquid form when the temperature of the flue gas is reduced in the $CO_2$ condensers.

The flue gas compressor is operative for compressing the flue gas to a pressure (for example about 30 bar or higher) at which gaseous $CO_2$ is converted to liquid form when the temperature of the flue gas is reduced in the $CO_2$ condensers.

Residual water in the $CO_2$ rich flue gas may cause formation of ice in the heat exchangers of the $CO_2$ condensers, eventually resulting in problems with reduced cooling capacity and clogging of the heat exchangers. By providing an adsorption drier upstream of the $CO_2$ condensers, such problems are avoided, or at least minimized. The adsorption drier may for example be configured to reduce the water dew point of the flue gas to about $-60°$ C.

According to other aspects illustrated herein, there is provided a flue gas treatment system for removing $CO_2$ from a flue gas stream, comprising a flue gas compressor,
a flue gas adsorption drier, and
a refrigeration system for condensation of carbon dioxide ($CO_2$) as defined hereinabove,
wherein the flue gas chiller is arranged between the flue gas compressor and the flue gas adsorption drier, and the first and second $CO_2$ condensers are arranged in series downstream of the flue gas adsorption drier.

According to some embodiments, the flue gas treatment system further comprises a first auxiliary refrigerant chiller configured to further chill the second portion of the chilled condensed refrigerant using liquid $CO_2$ separated in the first $CO_2$ condenser, before the refrigerant is used in the first $CO_2$ condenser, and/or a second auxiliary refrigerant chiller configured to further chill the third portion of the chilled condensed refrigerant using liquid $CO_2$ separated in the second $CO_2$ condenser, before the refrigerant is used in the second $CO_2$ condenser.

The first and/or second auxiliary refrigerant chillers maximizes the recovery of cold from the liquid $CO_2$ separated in the first and/or second $CO_2$ condenser.

According to some embodiments, the flue gas treatment system further comprises a $CO_2$ product pump, preferably arranged between a $CO_2$ condenser and a refrigerant chiller or auxiliary refrigerant chiller, configured to pump the liquid $CO_2$ separated in the first and/or second $CO_2$ condenser to a pressure, e.g. about 60 bar, sufficient to prevent evaporation of the condensed $CO_2$ in the refrigerant chiller and/or first auxiliary refrigerant chiller and/or second auxiliary refrigerant chiller.

According to some embodiments, the flue gas treatment system further comprises a heat exchanger configured to cool at least a portion of the condensed refrigerant using the $CO_2$ depleted flue gas from the second $CO_2$ condenser.

It has been found that the cold $CO_2$ depleted flue gas from the second $CO_2$ condenser may advantageously be used for precooling the condensed refrigerant coming form the refrigerant condenser, before it is chilled in the refrigerant chiller and/or auxiliary refrigerant chillers.

According to certain embodiments, the flue gas treatment system comprises a first heat exchanger configured to cool at least a portion of the condensed refrigerant using the $CO_2$ depleted flue gas from the second $CO_2$ condenser, a second heat exchanger configured to reheat the $CO_2$ depleted flue gas from the first heat exchanger using warm flue gas from the flue gas compressor, a flue gas expander configured to expand the reheated compressed $CO_2$ depleted flue gas from the second heat exchanger, and a third heat exchanger configured to further cool the condensed refrigerant from the first heat exchanger using the using the $CO_2$ depleted flue gas from the flue gas expander.

Cooling the condensed refrigerant in steps, maximizes the recovery of cold from the $CO_2$ depleted flue gas from the second $CO_2$ condenser.

According to some embodiments of the flue gas treatment system, the refrigerant chiller is configured to chill a first portion of the condensed refrigerant using liquid $CO_2$ separated in the first and/or second $CO_2$ condenser, and a heat exchanger is configured to cool a second portion of the condensed refrigerant using the $CO_2$ depleted flue gas from the second $CO_2$ condenser.

According to certain embodiments, the flue gas treatment system comprises a refrigerant chiller configured to chill a first portion of the condensed refrigerant using liquid $CO_2$ separated in the first and/or second $CO_2$ condenser, a first heat exchanger configured to cool a second portion of the condensed refrigerant using the $CO_2$ depleted flue gas from the second $CO_2$ condenser, a second heat exchanger configured to reheat the $CO_2$ depleted flue gas from the first heat exchanger using warm flue gas from the flue gas compressor, a flue gas expander configured to expand the reheated compressed $CO_2$ depleted flue gas from the second heat exchanger, and a third heat exchanger configured to cool a third portion of the condensed refrigerant using the using the $CO_2$ depleted flue gas from the flue gas expander.

According to some embodiments, the flue gas treatment system further comprises a flue gas condenser for removal of water vapor from the flue gas stream, arranged upstream of the flue gas compressor with reference to the general flow direction of the flue gas stream.

According to some embodiments, the flue gas treatment system further comprises a selective catalytic reduction (SCR) unit for removal of nitrogen oxides (NOx) from the flue gas stream, arranged downstream of the second $CO_2$ condenser with reference to the general flow direction of the flue gas stream.

According to aspects illustrated herein, there is provided a method for condensation of carbon dioxide ($CO_2$) in a flue gas stream using a circulating stream of an external refrigerant, said method comprising compression and at least partial condensation of external refrigerant to obtain condensed external refrigerant, condensation of $CO_2$ in the flue gas stream by refrigeration of the flue gas stream through at least partial evaporation of condensed external refrigerant obtained in step a), separation of the condensed $CO_2$ from the flue gas stream, and chilling of the condensed external refrigerant for use in the refrigeration of step b) using the condensed $CO_2$ separated in step c).

According to some embodiments, the pressure of the condensed $CO_2$ used for chilling of the condensed external refrigerant is kept sufficient to prevent evaporation of the condensed $CO_2$ during the chilling, e.g. about 60 bar.

According to some embodiments, the method further comprises precooling of the condensed external refrigerant for use in the refrigeration of step b) using the flue gas stream from which the condensed $CO_2$ has been separated, before the chilling of the condensed external refrigerant using the condensed $CO_2$ separated in step c).

According to some embodiments, the method further comprises chilling a first portion of the condensed external refrigerant for use in the refrigeration of step b) using the condensed $CO_2$ separated in step c), and chilling a second portion of the condensed external refrigerant for use in the refrigeration of step b) using the flue gas stream from which the condensed $CO_2$ has been separated.

The external refrigerant in embodiments of the above mentioned methods and systems may for example be propane or propylene.

The above described and other features are exemplified by the following figures and detailed description. Further objects and features of the present invention will be apparent from the description and the claims.

BRIEF DESCRIPTION OF THE DRAWINGS

Referring now to the figures, which are exemplary embodiments.

DETAILED DESCRIPTION

Pressures herein are in the unit "bar", and denote absolute pressures unless indicated otherwise.

The terms "indirect" or "indirectly" as used herein in connection with heat exchange between two fluids, such as heating, cooling or chilling, denotes that the heat exchange occurs without mixing the two fluids together. Such indirect heat exchange may for example be performed in an indirect-contact heat exchanger, wherein the fluid streams remain separate and the heat transfers continuously through an impervious dividing wall.

Figure 1:
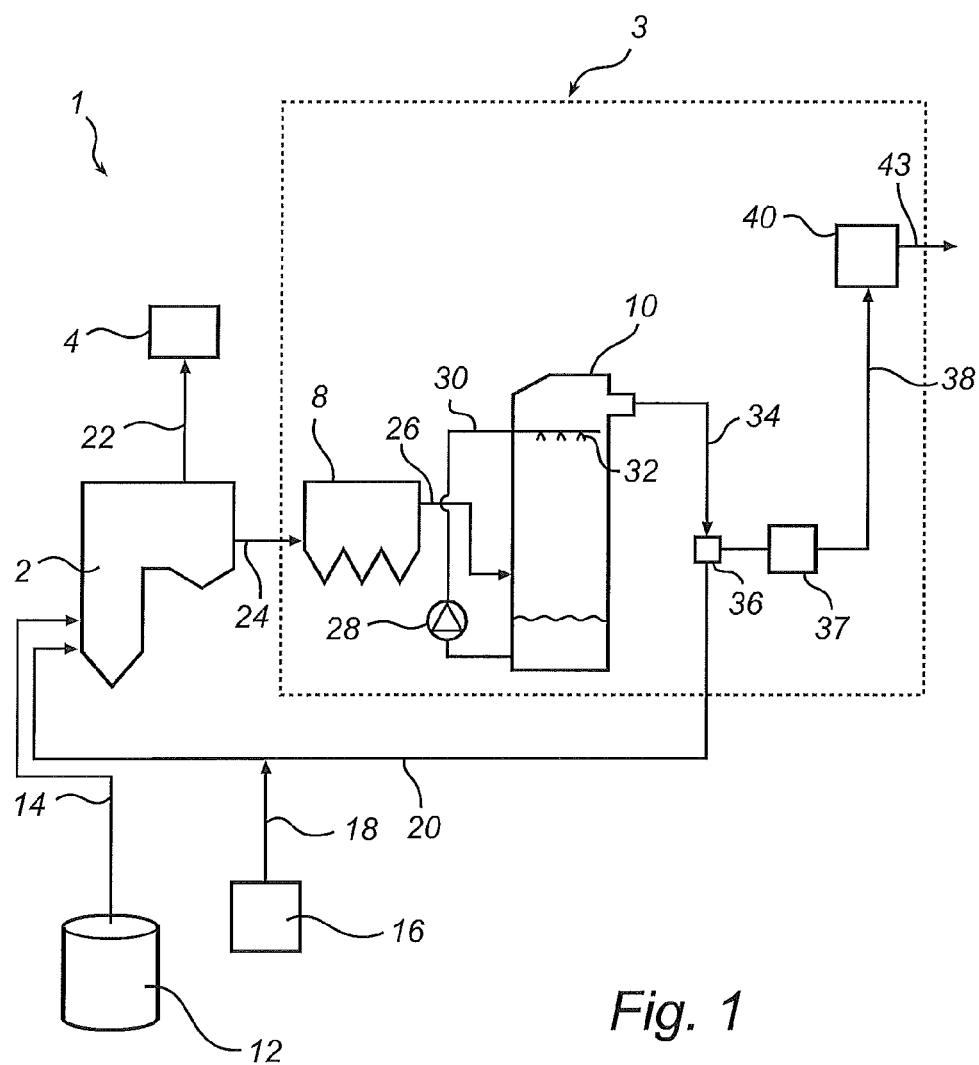
FIG. 1 schematically depicts a boiler system.

The refrigeration system or flue gas treatment system of the various aspects disclosed herein may for example be implemented in a combustion plant, such as a boiler system. FIG. 1 is a schematic representation of a boiler system 1, as seen from the side thereof. The boiler system 1 comprises, as main components, a boiler 2, being in this embodiment an oxy-fuel boiler, a steam turbine electric power generation system, schematically indicated as 4, and a flue gas treatment system 3. The flue gas treatment system may for example comprise a dust removal device, which may, for example, be a fabric filter or an electrostatic precipitator 8, a sulfur dioxide removal system, which may be a wet scrubber 10, and a $CO_2$ separation system 40, 140, 240.

A fuel, such as coal, oil, or peat, is contained in a fuel storage 12, and can be supplied to the boiler 2 via a supply pipe 14. An oxygen gas source 16 is operative for providing oxygen gas in a manner which is known per se. The oxygen gas source 16 may be an air separation plant operative for separating oxygen gas from air, an oxygen separating membrane, a storage tank, or any other source for providing oxygen gas to the boiler system 1. A supply duct 18 is operative for forwarding the produced oxygen gas, comprising typically 90-99.9 vol. % oxygen, $O_2$, to the boiler 2. A duct 20 is operative for forwarding recirculated flue gas, which contains carbon dioxide, to the boiler 2. As indicated in FIG. 1, the supply duct 18 joins the duct 20 upstream of the boiler 2, such that oxygen gas and recirculated flue gas, which contains carbon dioxide, may become mixed with each other to form a gas mixture containing typically about 20-50% by volume of oxygen gas, the balance being mainly carbon dioxide and water vapour, upstream of the boiler 2. Since almost no air enters the boiler 2 there is almost no nitrogen gas supplied to the boiler 2. In practical operation, less than 3% by volume of the gas volume supplied to the boiler 2 is air, which mainly enters the boiler system 1 as a leakage of air via, for example, the boiler 2 and the flue gas treatment system 3. The boiler 2 is operative for combusting the fuel, that is to be supplied via the supply pipe 14, in the presence of the oxygen gas, mixed with the recirculated flue gas, which contains carbon dioxide, that is to be supplied via the duct 20. A steam pipe 22 is operative for forwarding steam, that will be produced in the boiler 2 as a result of the combustion, to the steam turbine electric power generation system 4, which is operative for generating power in the form of electric power.

A duct 24 is operative for forwarding carbon dioxide rich flue gas generated in the boiler 2 to the dust removal device 8. By "carbon dioxide rich flue gas" is meant that the flue gas leaving the boiler 2 via the duct 24 will contain at least 40% by volume of carbon dioxide, $CO_2$. Often more than 50% by volume of the flue gas leaving the boiler 2 will be carbon dioxide. Typically, the flue gas leaving boiler 2 will contain 50-80% by volume of carbon dioxide. The balance of the "carbon dioxide rich flue gas" will be about 15-40% by volume of water vapour ($H_2O$), 2-7% by volume of oxygen ($O_2$), since a slight oxygen excess is often preferred in the boiler 2, and totally about 0-10% by volume of other gases, including mainly nitrogen ($N_2$) and argon (Ar), since some leakage of air can seldom be completely avoided.

The carbon dioxide rich flue gas generated in the boiler 2 may typically comprise contaminants in the form of, for example, dust particles, hydrochloric acid, HCl, nitrous oxides, $NO_X$, sulfur oxides, $SO_X$, and heavy metals, including mercury, Hg.

The dust removal device 8 removes most of the dust particles from the carbon dioxide rich flue gas. A duct 26 is operative for forwarding the carbon dioxide rich flue gas from the fabric filter 8 to the wet scrubber 10. The wet scrubber 10 comprises a circulation pump 28 which is operative for circulating, in a slurry circulation pipe 30, an absorption liquid, comprising for example lime stone, from the bottom of the wet scrubber 10 to a set of nozzles 32 arranged in the upper portion of the wet scrubber 10. The slurry nozzles 32 are operative for finely distributing the absorption liquid in the wet scrubber 10 to achieve good contact between the absorption liquid and the flue gas being forwarded to the wet scrubber 10 via the duct 26 and flowing substantially vertically upwards inside the wet scrubber 10 to effect efficient removal of sulfur dioxide, $SO_2$, and other acid gases from the carbon dioxide rich flue gas.

The flue gas treatment system 3 further comprises a flue gas condenser 37 where the flue gas is cooled below its water dew point and the heat released by the resulting condensation is recovered as low temperature heat. The water content of the flue gas may for example be reduced from about 40% by volume in the flue gas fed to the flue gas condenser to about 5% by volume in the flue gas leaving the flue gas condenser. Depending on pH and temperature in the flue gas condenser, the flue gas condensation may also lead to a reduction of sulfur oxides, $SO_x$, in the flue gas. The sulfur oxides are captured in the formed condensate and separated from the flue gas. Furthermore, wash liquid or slurry, e.g. lime slurry, entrained in the flue gas from the preceding sulfur dioxide removal step is removed during the condensation.

An at least partly cleaned carbon dioxide rich flue gas leaves the wet scrubber 10 via a duct 34 which forwards the flue gas to a gas splitting point 36, where the at least partly cleaned carbon dioxide rich flue gas is divided into two flows, namely a first flow, which via the duct 20 is recirculated back to the boiler 2, and a second flow, which via the flue gas condenser 37 and duct 38 is forwarded to the $CO_2$ separation system. In the $CO_2$ separation system, $CO_2$ is at least partially separated from the light gases (e.g. $N_2$, Ar, $O_2$) of the flue gas by compression and condensation. Compressed carbon dioxide hence leaves the $CO_2$ separation system via a duct 43 and is transported away for disposal, which is sometimes referred to as "$CO_2$ sequestration". The first flow, which is recirculated back to the boiler 2 via duct 20, typically comprises 50-75% by volume of the total flow of the carbon dioxide rich flue gas leaving the wet scrubber 10. The second flow, typically comprising 25-50% by volume of the total flow of the carbon dioxide rich flue gas leaving the wet scrubber 10 is, hence, forwarded, via the flue gas condenser 37 and duct 38, to the $CO_2$ separation system 40, 140, 240, which will be described in more detail hereinafter.

Figure 2:
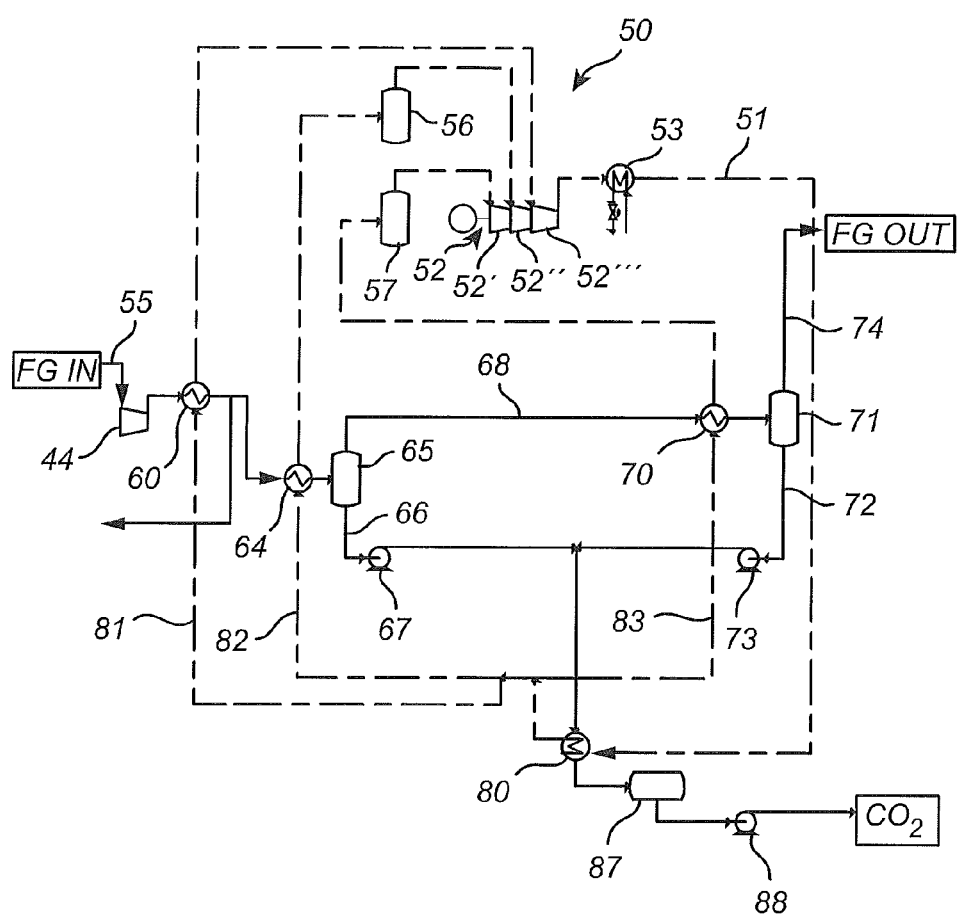
FIG. 2 schematically depicts an embodiment of a $CO_2$ separation system.

$CO_2$ separation in the embodiments described herein is achieved by means of compression of the flue gas and condensation by refrigeration. FIG. 2 schematically illustrates a $CO_2$ separation system for condensation of carbon dioxide ($CO_2$) in a flue gas stream. The $CO_2$ separation system of FIG. 2 may be implemented in the boiler system of FIG. 1. The $CO_2$ separation system 40 comprises a flue gas conduit 55 operative for forwarding flue gas from a boiler to a stack, optionally via one or more flue gas treatment units, such as a dust removal device, a sulfur dioxide removal system, and a flue gas condenser.

The $CO_2$ separation system 40 may optionally comprise at least one compressor 44 having at least one, and typically two to ten compression stages for compressing the carbon dioxide rich flue gas. The flue gas compressor is operative for compressing the flue gas to a pressure at which gaseous $CO_2$ is converted to liquid form when the temperature of the flue gas is reduced in the $CO_2$ condensers 64, 70. The carbon dioxide rich flue gas is generally compressed to a pressure of about 20 bar or higher, such as about 33 bar, in the multistage compressor. Each compression stage could be arranged as a separate unit. As an alternative several compression stages could be operated by a common drive shaft. The compressor 44 may also comprise an intercooling unit (not shown), downstream of one or more of the compression stages. The intercooling unit may further be configured to collect and dispose of any liquid condensate formed during compression and/or cooling of the carbon dioxide rich flue gas.

The $CO_2$ separation system 40 comprises a refrigeration system 50 having a refrigeration circuit 51 containing refrigerant in liquid and/or vapor form. A number of different refrigerants can be used to supply the cooling and condensing duties required for condensation of $CO_2$ in the refrigeration system. Examples of refrigerants that can be used include propane (R290) and propylene (R1270) and mixtures thereof. Other refrigerants having the desired thermodynamic and chemical properties can also be used as desired.

The refrigeration circuit 51 comprises a multistage refrigerant 52 compressor configured to compress the refrigerant to a predetermined pressure. The multistage compressor 52 may for example have three or more compression stages, each compression stage configured to compress the refrigerant to a certain pressure level. The multistage compressor 52 may be provided with intercooling between two or more of the compression stages.

Cold, gaseous refrigerant is compressed from a low pressure within the multistage compressor 52 to a pressure P0, for example in the range of about 8 to 25 bar (depending on the refrigerant and condensing medium temperature), and directed into refrigerant condenser 53. High pressure refrigerant is then substantially condensed within refrigerant condenser 53, which may be cooled by water, forced air or the like.

The condensed refrigerant is distributed to a flue gas chiller 60, a first $CO_2$ condenser 64 and a second $CO_2$ condenser 70, where it is used for chilling the flue gas containing $CO_2$.

The flue gas chiller 60 comprises a metering device, for example an expansion valve (not shown), for reducing the pressure and inducing evaporation of the condensed refrigerant. The flue gas chiller further comprises a heat exchanger, in which the refrigerant is expanded to a pressure P1, for example about 5 bar, and the boiling refrigerant is used to indirectly chill the flue gas stream to a temperature in the range of about 10-20° C. Water which precipitates from the flue gas during the chilling in the flue gas chiller is separated from the flue gas stream and removed via line 61. The chilled flue gas depleted in water vapor from the flue gas chiller is then forwarded to the first $CO_2$ condenser 64, optionally via an adsorption drier (not shown).

The first $CO_2$ condenser 64 comprises a metering device, for example an expansion valve (not shown), for reducing the pressure and inducing evaporation of the condensed refrigerant. The first $CO_2$ condenser 64 further comprises a heat exchanger, in which liquefied refrigerant is expanded to a pressure P2 which is lower than P1, for example about 2.7 bar, and the boiling refrigerant is used to indirectly chill the flue gas stream to a temperature of about −20° C., causing at least a portion of the $CO_2$ from the flue gas to condense. The first $CO_2$ condenser 64 further comprises a first gas/liquid separator 65. The gas/liquid separator 65 separates condensed $CO_2$ in liquid form from the residual partially $CO_2$ depleted flue gas (vent gas). The liquefied $CO_2$ leaves the gas/liquid separator 65 via line 66 and is pumped to a $CO_2$ product drum by $CO_2$ product pump 67. The vent gas leaves the gas/liquid separator 65 via line 68.

The partially $CO_2$ depleted ventgas is forwarded via line 68 to the second $CO_2$ condenser 70. The second $CO_2$ condenser 70 comprises a metering device, for example an expansion valve (not shown), for reducing the pressure and inducing evaporation of the condensed refrigerant. The second $CO_2$ condenser 70 further comprises a heat exchanger, in which liquefied refrigerant is expanded to a pressure P3 which is lower than P2, for example atmospheric pressure (about 1 bar), and the boiling refrigerant is used to indirectly chill the flue gas stream to a temperature of about −42° C., causing at least a portion of the $CO_2$ from the flue gas to condense. The refrigeration temperature is limited by the minimal achievable temperature of the refrigerant. For propylene or propane, this temperature limit would be about −45° C. at ambient pressure level. The second $CO_2$ condenser 70 further comprises a gas/liquid separator 71. The gas/liquid separator 71 separates condensed $CO_2$ in liquid form from the residual partially $CO_2$ depleted flue gas (vent gas). The liquefied $CO_2$ leaves the gas/liquid separator 71 via line 72 and is pumped to a $CO_2$ product drum by $CO_2$ product pump 73. The vent gas leaves the gas/liquid separator 71 via line 74.

The refrigeration system 50 further comprises a refrigerant chiller 80. The refrigerant chiller 80 comprises a heat exchanger configured to chill refrigerant by indirect contact with cold condensed $CO_2$ from the first and/or second $CO_2$ condensers 64, 70. The temperature of the condensed $CO_2$ from the first and second $CO_2$ condensers 64, 70 may generally be about −20° C. and −42° C. respectively. The temperature of the refrigerant may be reduced from in the range of about 15-30° C. to about −17° C. in the refrigerant chiller 80.

The chilled refrigerant from the refrigerant chiller 80 is distributed via lines 81, 82, 83 to the flue gas chiller 60, a first $CO_2$ condenser 64 and a second $CO_2$ condenser 70. The quantity of refrigerant distributed to each of the flue gas chiller, the first $CO_2$ condenser and the second $CO_2$ condenser may be selected so as to provide the desired refrigeration in each heat exchanger.

Used refrigerant from the flue gas chiller 60, the first $CO_2$ condenser 64 and the second $CO_2$ condenser 70 is returned to the multistage compressor 52 for recompression and use for further cooling of the flue gas stream. The used refrigerant from the flue gas chiller 60 at a pressure P1, for example about 5 bar, is forwarded to a first compression stage 52' of the multistage compressor 52 suitable for receiving refrigerant at a pressure of P1. The used refrigerant from the first $CO_2$ condenser 64 at a pressure P2, for example about 2.7 bar, is forwarded, optionally via a refrigerant compressor suction drum 56, to a second compression stage 52" of the multistage compressor 52 suitable for receiving refrigerant at a pressure of P2. The used refrigerant from the second $CO_2$ condenser 70 at a pressure P3, for example about 1 bar, is forwarded, optionally via a refrigerant compressor suction drum 57, to a third compression stage 52''' of the multistage compressor 52 suitable for receiving refrigerant at a pressure of P3. The used refrigerant streams are then recompressed to pressure P0 and reused in the refrigeration circuit.

The liquid $CO_2$ product from the refrigerant chiller 80 may be collected in a $CO_2$ product drum 87 and can then be pumped by $CO_2$ product pump 88 to a pressure level suitable for transportation or further processing. If the pressure would be increased to this level in a single step in $CO_2$ product pump 67 or 73, the pump would introduce too much heat into the $CO_2$ product stream and thereby reduce the duty available for chilling of the refrigerant in the refrigerant chiller and/or auxiliary refrigerant chiller(s).

Figure 3:
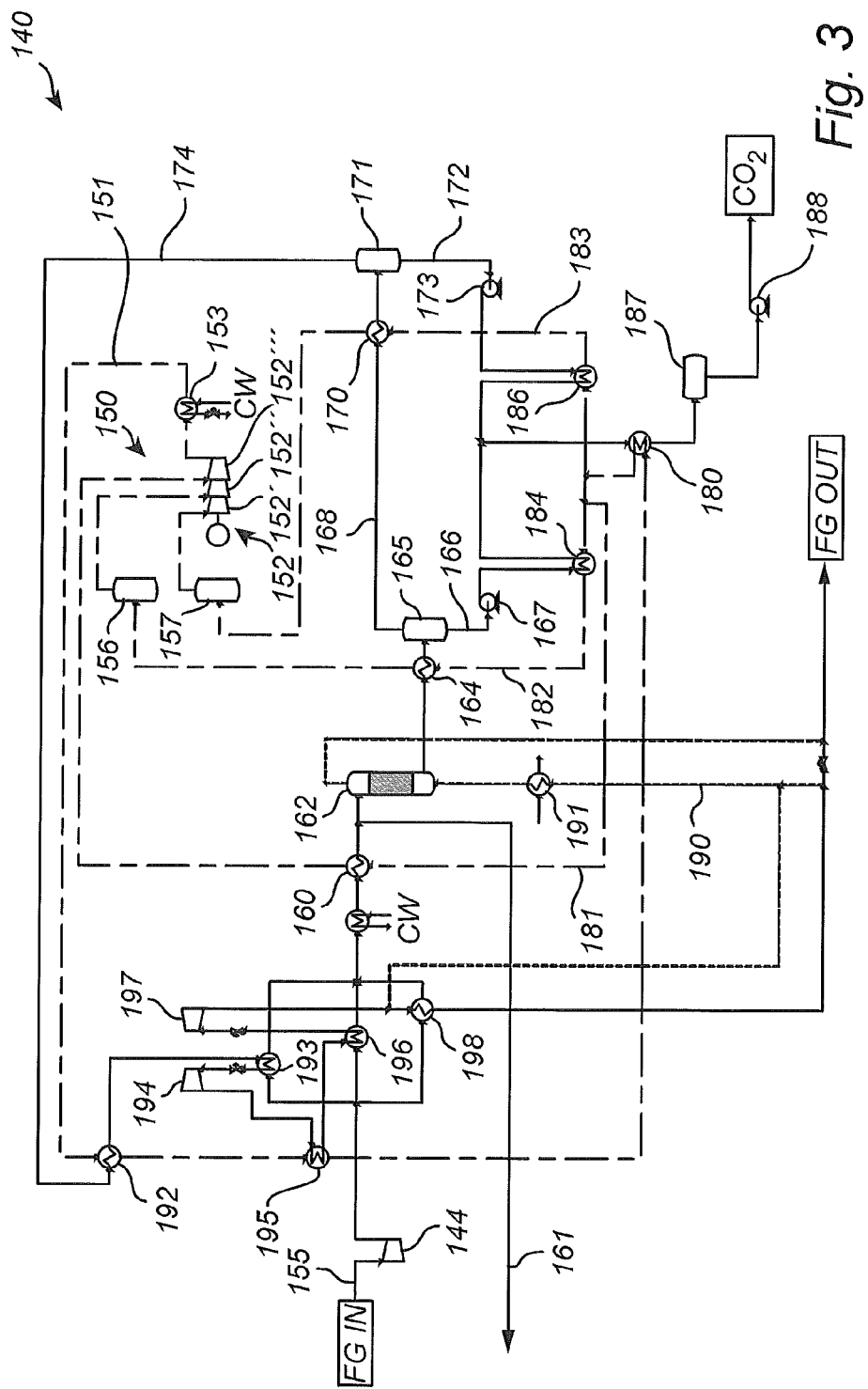
FIG. 3 schematically depicts an embodiment of a $CO_2$ separation system.

FIG. 3 schematically depicts an embodiment of a $CO_2$ separation system integrated into a flue gas treatment system for removing $CO_2$ from a flue gas stream, for example a flue gas stream generated in a boiler combusting a fuel in the presence of a gas containing oxygen.

The $CO_2$ separation system 140 comprises at least one compressor 144 having at least one, and typically two to ten compression stages for compressing the carbon dioxide rich flue gas. The flue gas compressor 144 is operative for compressing the flue gas to a pressure at which gaseous $CO_2$ is converted to liquid form when the temperature of the flue gas is reduced in the $CO_2$ condensers 164, 170. The carbon dioxide rich flue gas is generally compressed to a pressure of about 20 bar or higher, such as about 33 bar, in the multistage compressor. Each compression stage could be arranged as a separate unit. As an alternative several compression stages could be operated by a common drive shaft. The compressor 144 may also comprise an intercooling unit (not shown), downstream of one or more of the compression stages. The intercooling unit may further be configured to collect and dispose of any liquid condensate formed during compression and/or cooling of the carbon dioxide rich flue gas.

Residual water may cause formation of ice in the heat exchangers of the $CO_2$ condensers, eventually resulting in problems with reduced cooling capacity and clogging of the heat exchangers. By providing an adsorption drier upstream of the $CO_2$ condensers, such problems are avoided, or at least minimized. Thus, the $CO_2$ separation system 140 may further comprise an adsorption drier 162 operative for removing at least a portion of the remaining water vapor in the $CO_2$ rich flue gas stream. The adsorption drier 162 is provided with a packing comprising a water vapor adsorbent, also referred to as a desiccant, having affinity for water vapour. The desiccant may, for example, be silica gel, calcium sulfate, calcium chloride, montmorillonite clay, molecular sieves, or another material that is, as such, known for its use as a desiccant. Hence, as the compressed and chilled carbon dioxide rich flue gas passes through the packing, at least a portion of the content of water vapour of the gas will be adsorbed on the desiccant of the packing. Since water vapor in the flue gas could block the heat exchangers of the $CO_2$ condensers, the water dew point of the flue gas is reduced to about −60° C. in the adsorption drier. The drier material may preferably be selected such that it can withstand eventually forming acids. This allows omitting additional steps for removal of $SO_X$ and $NO_X$ compounds that could otherwise harm the integrity of the adsorbent.

The adsorption drier 162 may be provided with a regeneration and heating system for intermittent regeneration of the water vapour adsorption capacity of the adsorption drier. A supply duct 190 is arranged for supplying a regeneration gas to the system. The regeneration gas is preferably an inert gas which does not react with the packing of the adsorption drier. Examples of suitable gases include nitrogen or another inert gas that, preferably, holds a low amount of mercury and water vapour. Preferably, vent gas usually comprising nitrogen as one of its main constituents, separated from the carbon dioxide in the $CO_2$ separation system 140 is utilized as regeneration gas. The regeneration system comprises a heater 191 which is adapted for heating the regeneration gas.

A heating circuit is connected to the heater for circulating a heating medium, such as steam, in the heater. For regeneration of the material of the packing of the adsorption drier 162, the heater may typically heat the regeneration gas to a temperature of about 120-300° C. During a regeneration sequence, the heated regeneration gas is supplied to the adsorption drier 162 from the regeneration and heating system. The regeneration gas heats the material of the packing and causes a desorption of water vapour.

According to one embodiment, the system may be provided with two parallel adsorption driers, with one of those parallel adsorption driers being in operation while the other parallel adsorption drier undergoes regeneration. According to another embodiment, the carbon dioxide rich flue gas could be emitted to the atmosphere during the regeneration of the packing of the adsorption drier.

With reference to FIG. 3, the flue $CO_2$ separation system 140 comprises a refrigeration system 150 for condensation of carbon dioxide in the flue gas stream. The refrigeration system 150 comprises a refrigeration circuit 151 containing refrigerant in liquid and/or vapor form. A number of different refrigerants can be used to supply the cooling and condensing duties required for condensation of $CO_2$ in the refrigeration system. Examples of refrigerants that can be used include propane (R290) and propylene (R1270) and mixtures thereof. Other refrigerants having the desired thermodynamic and chemical properties also can be used as desired.

The refrigeration circuit 151 comprises a multistage refrigerant compressor 152 configured to compress the refrigerant to a predetermined pressure. The multistage compressor may for example have three or more compression stages, each compression stage configured to compress the refrigerant to a certain pressure level. The multistage compressor may be provided with intercooling between two or more of the compression stages.

Cold, gaseous refrigerant is compressed from a low pressure within the multistage compressor 152 to a pressure P0, for example in the range of about 8 to about 25 bar (depending on the refrigerant and condensing medium temperature), and directed into refrigerant condenser 153. High pressure refrigerant is then substantially condensed within refrigerant condenser 153, which may be cooled by water, forced air or the like.

The condensed refrigerant is distributed to a flue gas chiller 160, a first $CO_2$ condenser 164 and a second $CO_2$ condenser 170, where it is used for chilling the flue gas containing $CO_2$ travelling in the flue gas conduit 155.

The flue gas chiller 160 comprises a metering device, for example an expansion valve (not shown), for reducing the pressure and inducing evaporation of the condensed refrigerant. The flue gas chiller further comprises a heat exchanger, in which the refrigerant is expanded to a pressure P1, for example about 5 bar, and the boiling refrigerant is used to indirectly chill the flue gas stream to a temperature in the range of about 6 to 20° C. Water which precipitates from the flue gas during the chilling in the flue gas chiller is separated from the flue gas stream and removed via line 161. The chilled flue gas depleted in water vapor from the flue gas chiller is then forwarded to the adsorption drier 162.

The chilled and dried flue gas from the adsorption drier 162 is forwarded to the first $CO_2$ condenser 164. The first $CO_2$ condenser comprises a metering device, for example an expansion valve (not shown), for reducing the pressure and inducing evaporation of the condensed refrigerant. The first $CO_2$ condenser further comprises a heat exchanger, in which liquefied refrigerant is expanded to a pressure P2 which is lower than P1, for example about 2.7 bar, and the boiling refrigerant is used to indirectly chill the flue gas stream to a temperature of about −20° C., causing at least a portion of the $CO_2$ from the flue gas to condense. The first $CO_2$ condenser 164 further comprises a first gas/liquid separator 165. The gas/liquid separator 165 separates condensed $CO_2$ in liquid form from the residual partially $CO_2$ depleted flue gas (vent gas). The liquefied $CO_2$ leaves the gas/liquid separator 165 via line 166 and is pumped by $CO_2$ product pump 167 to a pressure, for example about 60 bar, sufficient to prevent evaporation of the $CO_2$ product when it is used for cooling the refrigerant in the refrigerant chiller 180 and/or auxiliary refrigerant chiller 184. The vent gas leaves the gas/liquid separator 165 via line 168.

The partially $CO_2$ depleted ventgas is forwarded via line 168 to the second $CO_2$ condenser 170. The second $CO_2$ condenser comprises a metering device, for example an expansion valve (not shown), for reducing the pressure and inducing evaporation of the condensed refrigerant. The second $CO_2$ condenser further comprises a heat exchanger, in which liquefied refrigerant is expanded to a pressure P3 which is lower than P2, for example atmospheric pressure (about 1 bar), and the boiling refrigerant is used to indirectly chill the flue gas stream to a temperature of about −42° C., causing at least a portion of the $CO_2$ from the flue gas to condense. The refrigeration temperature is limited by the minimal achievable temperature of the refrigerant. For propylene or propane, this temperature limit would be about −45° C. at ambient pressure level. The second $CO_2$ condenser further comprises a gas/liquid separator 171. The gas/liquid separator 171 separates condensed $CO_2$ in liquid form from the residual partially $CO_2$ depleted flue gas (vent gas). The liquefied $CO_2$ leaves the gas/liquid separator 171 via line 172 and is pumped by $CO_2$ product pump 173 to a pressure, for example about 60 bar, sufficient to prevent evaporation of the $CO_2$ product when it is used for cooling the refrigerant in the refrigerant chiller 180 and/or auxiliary refrigerant chiller 186. The vent gas leaves the gas/liquid separator 171 via line 174.

The refrigeration system 150 further comprises a refrigerant chiller 180. The refrigerant chiller 180 comprises a heat exchanger configured to chill refrigerant by indirect contact with cold condensed $CO_2$ from the first and second $CO_2$ condensers 164, 170. The temperature of the condensed $CO_2$ from the first and second $CO_2$ condensers 164, 170 may generally be about −20° C. and −42° C. respectively. The temperature of the refrigerant may be reduced from in the range of about 15-30° C. to about −10° C. in the refrigerant chiller 180.

The chilled refrigerant from the refrigerant chiller 180 is split and distributed via lines 181, 182, 183 to the flue gas chiller 160, first $CO_2$ condenser 164 and second $CO_2$ condenser 170. The quantity of refrigerant distributed to each of the flue gas chiller 160, the first $CO_2$ condenser 164 and the second $CO_2$ condenser 170 may be selected so as to provide the desired refrigeration in each heat exchanger.

The refrigeration system 150 in FIG. 3 further comprises two auxiliary refrigerant chillers 184, 186 for further improving the recovery of cold from the cold condensed $CO_2$ from the first and second $CO_2$ condensers 164, 170. The first auxiliary refrigerant chiller 184 is arranged on line 168 between the first $CO_2$ condenser and the refrigerant chiller 180, and configured to further chill the refrigerant coming from the refrigerant chiller 180 to about −17° C., by indirect contact with cold condensed $CO_2$ from the first $CO_2$ condenser 164. The second auxiliary refrigerant chiller 186 is arranged on line 174 between the second $CO_2$ condenser 170 and the refrigerant chiller 180, and configured to further chill the refrigerant coming from the refrigerant chiller 180 to about −39° C., by indirect contact with cold condensed $CO_2$ from the second $CO_2$ condenser 170.

The liquid $CO_2$ product from the refrigerant chiller 180 may be collected in a $CO_2$ product drum 187 and can then be pumped by $CO_2$ product pump 188 to a pressure level suitable for transportation or further processing. If the pressure would be increased to this level in a single step in $CO_2$ product pump 167 or 173, the pump would introduce too much heat into the $CO_2$ product stream and thereby reduce the duty available for chilling of the refrigerant in the refrigerant chiller and/or auxiliary refrigerant chiller(s).

The refrigeration system 150 in FIG. 3 further comprises an arrangement for precooling at least a portion of the condensed refrigerant coming from the refrigerant condenser using the cold $CO_2$ depleted flue gas from the second $CO_2$ condenser. The arrangement comprises a first heat exchanger 192 configured for cooling the refrigerant coming from the refrigerant condenser 153, by indirect contact with cold $CO_2$ depleted flue gas from the second $CO_2$ condenser 170 via line 174. A second heat exchanger 193 is configured to reheat the $CO_2$ depleted flue gas from the first heat exchanger 192 using warm flue gas from the flue gas compressor 144. A flue gas expander 194 is configured to expand the reheated compressed $CO_2$ depleted flue gas from the second heat exchanger resulting in a reduction of temperature of the flue gas. The flue gas from the flue gas expander 194 is forwarded to a third heat exchanger 195 where it is used to further cool the condensed refrigerant from the first heat exchanger.

Optionally, the arrangement further comprises a fourth heat exchanger 196 configured to reheat the $CO_2$ depleted flue gas from the third heat exchanger 195 using warm flue gas from the flue gas compressor 144, a second flue gas expander 197 configured to expand the reheated $CO_2$ depleted flue gas from the fourth heat exchanger 196 resulting in a reduction of temperature of the flue gas, and a fifth heat exchanger 198 configured to reheat the expanded flue gas from the second flue gas expander 197 using warm flue gas from the flue gas compressor 144. This optional arrangement provides a reheated flue gas which is suitable, possibly after additional heating in a regeneration gas heater 191, for use as a regeneration gas for regeneration of the adsorption drier 162 as described above. The reheated flue gas may be forwarded to an (optional) SCR unit for removal of nitrogen oxides from the flue gas by selective catalytic reduction to $N_2$.

Used refrigerant from the flue gas chiller 160, the first $CO_2$ condenser 164 and the second $CO_2$ condenser 170 is returned to the multistage compressor 152 for recompression and use for further cooling of the flue gas stream. The used refrigerant from the flue gas chiller 160 at a pressure P1, for example about 5 bar, is forwarded to a first compression stage 152' of the multistage compressor 152 suitable for receiving refrigerant at a pressure of P1. The used refrigerant from the first $CO_2$ condenser 164 at a pressure P2, for example about 2.7 bar, is forwarded, optionally via a refrigerant compressor suction drum 156, to a second compression stage 152" of the multistage compressor 152 suitable for receiving refrigerant at a pressure of P2. The used refrigerant from the second $CO_2$ condenser 170 at a pressure P3, for example about 1 bar, is forwarded, optionally via a refrigerant compressor suction drum 157, to a third compression stage 152''' of the multistage compressor 152 suitable for receiving refrigerant at a pressure P3. The used refrigerant streams are then recompressed to pressure P0 and reused in the refrigeration circuit.

Figure 4:
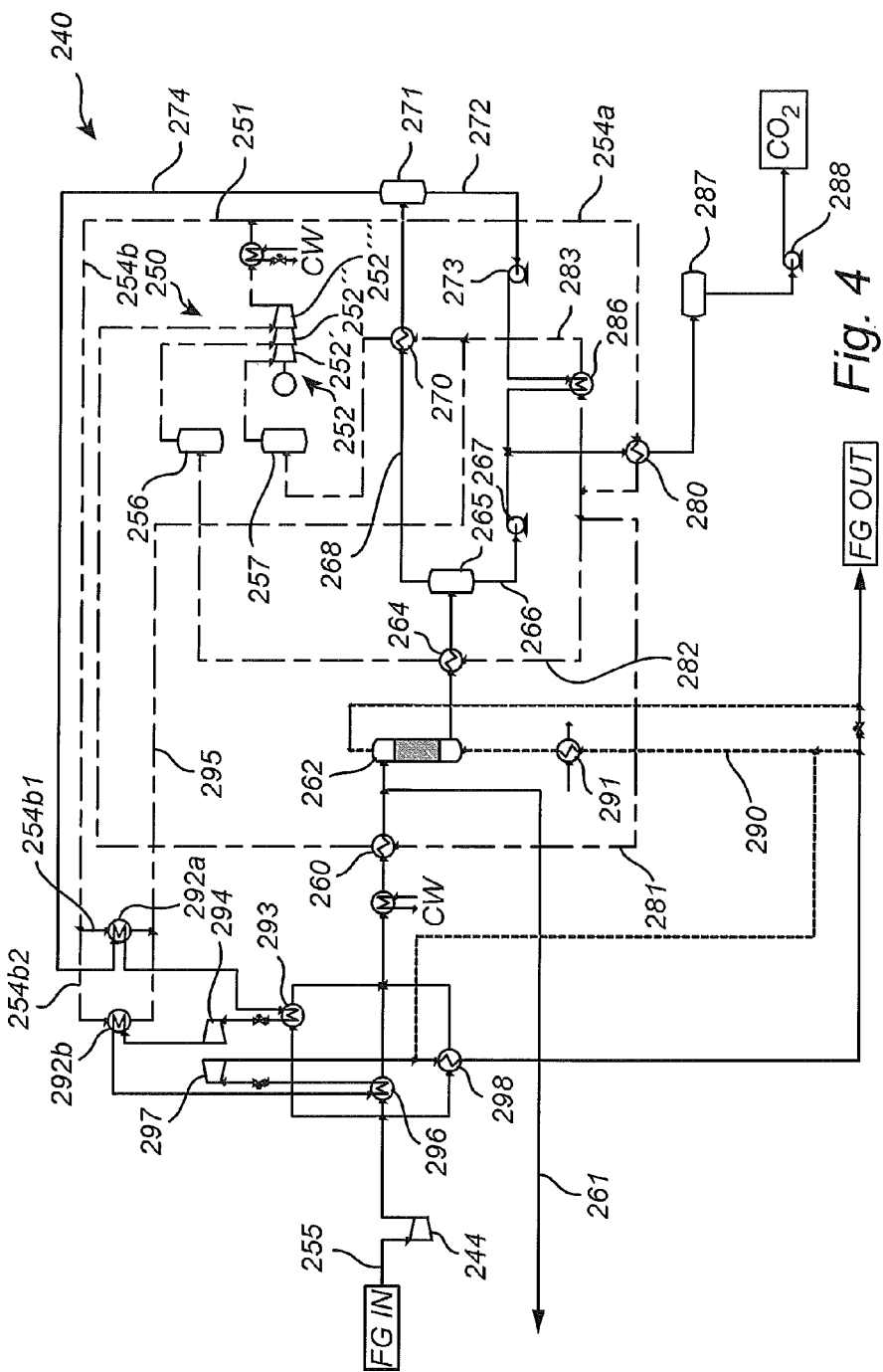
FIG. 4 schematically depicts an embodiment of a $CO_2$ separation system.

With reference to FIG. 4, the $CO_2$ separation system 240 comprises an alternative refrigeration system 250. The refrigeration system 250 comprises a refrigeration circuit 251 containing refrigerant in liquid and/or vapor form. A number of different refrigerants can be used to supply the cooling and condensing duties required for condensation of $CO_2$ in the refrigeration system. Examples of refrigerants that can be used include R290 (propane) and R1270 propylene and mixtures thereof. Other refrigerants having the desired thermodynamic and chemical properties also can be used as desired.

The refrigeration circuit comprises a multistage refrigerant compressor 252 configured to compress the refrigerant to a predetermined pressure. The multistage compressor may for example have three or more compression stages, each compression stage configured to compress the refrigerant to a certain pressure level. The multistage compressor may be provided with intercooling between two or more of the compression stages.

Cold, gaseous refrigerant is compressed from a low pressure within the multistage compressor 252 to a pressure P0, for example in the range of about 8 to about 25 bar (depending on the refrigerant and condensing medium temperature), and directed into refrigerant condenser 253. High pressure refrigerant is then substantially condensed within refrigerant condenser 253, which may be cooled by water, forced air or the like.

The refrigeration circuit 251 comprises a liquid split which splits the refrigerant flow from the refrigerant condenser 253 into a first and second portion. The first portion of the condensed refrigerant is directed via line 254a to a refrigerant chiller 280 configured to chill the first portion of the condensed refrigerant using liquid $CO_2$ separated in the first and/or second $CO_2$ condenser 264, 270. The second portion of the condensed refrigerant is directed via line 254b to a heat exchanger arrangement configured to cool a second portion of the condensed refrigerant using the $CO_2$ depleted flue gas from the second $CO_2$ condenser 270.

The first portion of the condensed refrigerant is forwarded from the refrigerant condenser 253 to the refrigerant chiller 280 via line 254a. The refrigerant chiller comprises a heat exchanger configured to chill refrigerant by indirect contact with cold condensed $CO_2$ from the first and second $CO_2$ condensers 264, 270. The temperature of the condensed $CO_2$ from the first and second $CO_2$ condensers 264, 270 may generally be about −20° C. and −42° C. respectively. The temperature of the refrigerant may be reduced from in the range of about 15-30° C. to about −17° C. in the refrigerant chiller 280.

The chilled refrigerant from the refrigerant chiller 280 is split and distributed via lines 281, 282, 283 to a flue gas chiller 260, a first $CO_2$ condenser 264 and a second $CO_2$ condenser 270. The quantity of refrigerant distributed to each of the flue gas chiller 260, the first $CO_2$ condenser 264 and the second $CO_2$ condenser 270 may be selected so as to provide the desired refrigeration in each heat exchanger.

The flue gas chiller 260 comprises a metering device, for example an expansion valve (not shown), for reducing the pressure and inducing evaporation of the condensed refrigerant. The flue gas chiller further comprises a heat exchanger, in which the refrigerant is expanded to a pressure P1, for example about 5 bar, and the boiling refrigerant is used to indirectly chill the flue gas stream to a temperature in the range of about 6 to 20° C. Water which precipitates from the flue gas during the chilling in the flue gas chiller is separated from the flue gas stream and removed via line 261. The chilled flue gas depleted in water vapor from the flue gas chiller is then forwarded to the first $CO_2$ condenser 264, optionally via an adsorption drier 262.

The first $CO_2$ condenser comprises a metering device, for example an expansion valve (not shown), for reducing the pressure and inducing evaporation of the condensed refrigerant. The first $CO_2$ condenser further comprises a heat exchanger, in which liquefied refrigerant is expanded to a pressure P2 which is lower than P1), for example about 2.7 bar, and the boiling refrigerant is used to indirectly chill the flue gas stream to a temperature of about −20° C., causing at least a portion of the $CO_2$ from the flue gas to condense. The first $CO_2$ condenser 264 further comprises a first gas/liquid separator 265. The gas/liquid separator 265 separates condensed $CO_2$ in liquid form from the residual partially $CO_2$ depleted flue gas (vent gas). The liquefied $CO_2$ leaves the gas/liquid separator 265 via line 266 and is pumped by $CO_2$ product pump 267 to a pressure, for example about 60 bar, sufficient to prevent evaporation of the $CO_2$ product when it is used for cooling the refrigerant in the refrigerant chiller 280. The vent gas leaves the gas/liquid separator 265 via line 268.

The partially $CO_2$ depleted ventgas is forwarded via line 268 to the second $CO_2$ condenser 270. The second $CO_2$ condenser comprises a metering device, for example an expansion valve (not shown), for reducing the pressure and inducing evaporation of the condensed refrigerant. The second $CO_2$ condenser further comprises a heat exchanger, in which liquefied refrigerant is expanded to a pressure P3 which is lower than P2, for example atmospheric pressure (about 1 bar), and the boiling refrigerant is used to indirectly chill the flue gas stream to a temperature of about −42° C., causing at least a portion of the $CO_2$ from the flue gas to condense. The refrigeration temperature is limited by the minimal achievable temperature of the refrigerant. For propylene or propane, this temperature limit would be about −45° C. at ambient pressure level. The second $CO_2$ condenser further comprises a gas/liquid separator 271. The gas/liquid separator 271 separates condensed $CO_2$ in liquid form from the residual partially $CO_2$ depleted flue gas (vent gas). The liquefied $CO_2$ leaves the gas/liquid separator 271 via line 272 and is pumped by $CO_2$ product pump 273 to a pressure, for example about 60 bar, sufficient to prevent evaporation of the $CO_2$ product when it is used for cooling the refrigerant in the refrigerant chiller 280 and auxiliary refrigerant chiller 286. The vent gas leaves the gas/liquid separator 271 via line 274.

The refrigeration system 250 in FIG. 4 further comprises an auxiliary refrigerant chiller 286 for further improving the recovery of cold from the cold condensed $CO_2$ from the second $CO_2$ condenser 270. The auxiliary refrigerant chiller 286 is arranged on line 272 between the second $CO_2$ condenser 270 and the refrigerant chiller 280, and configured to further chill the refrigerant coming from the refrigerant chiller 280 to about −39° C., by indirect contact with cold condensed $CO_2$ from the second $CO_2$ condenser 270.

The liquid $CO_2$ product from the refrigerant chiller 280 may be collected in a $CO_2$ product drum 287 and can then be pumped by $CO_2$ product pump 288 to a pressure level suitable for transportation or further processing. If the pressure would be increased to this level in a single step in $CO_2$ product pump 273, the pump would introduce too much heat into the $CO_2$ product stream and thereby reduce the duty available for chilling of the refrigerant in the refrigerant chiller 280 and auxiliary refrigerant chiller 286.

The second portion of the condensed refrigerant is directed via line 254b to a heat exchanger arrangement configured to cool a second portion of the condensed refrigerant using the $CO_2$ depleted flue gas from the second $CO_2$ condenser 270. The heat exchanger arrangement comprises two heat exchangers 292a, 292b arranged in parallel. The second portion of the condensed refrigerant from the refrigerant condenser is divided into two substreams, each directed towards one of the two heat exchangers via lines 254b1 and 254b2 respectively. The heat exchanger 292a is configured to cool substream 254b1 of the condensed refrigerant using the $CO_2$ depleted flue gas from the second $CO_2$ condenser 270. The heat exchanger 293 is configured to reheat the $CO_2$ depleted flue gas from the heat exchanger 292a using the warm flue gas from the flue gas compressor 244. A flue gas expander 294 is configured to expand the reheated compressed $CO_2$ depleted flue gas from the heat exchanger 293. The heat exchanger 292b is configured to cool substream 254b2 of the condensed refrigerant using the $CO_2$ depleted flue gas from the flue gas expander 294. The cooled first and second substreams from the heat exchangers 292a, 292b are combined and forwarded via line 295 to line 283, where it is combined with the refrigerant coming from the auxiliary refrigerant chiller 286.

Optionally, the arrangement further comprises a heat exchanger 296 configured to reheat the $CO_2$ depleted flue gas from the heat exchanger 292b using warm flue gas from the flue gas compressor 244, a second flue gas expander 297 configured to expand the reheated $CO_2$ depleted flue gas from the heat exchanger 296 resulting in a reduction of temperature of the flue gas, and a heat exchanger 298 configured to reheat the expanded flue gas from the second flue gas expander 297 using warm flue gas from the flue gas compressor 244. This optional arrangement provides a reheated flue gas which is suitable, possibly after additional heating in a regeneration gas heater 291, for use as a regeneration gas for regeneration of the adsorption drier 262 as described above. The reheated flue gas may be forwarded to an (optional) SCR unit for removal of nitrogen oxides from the flue gas by selective catalytic reduction to $N_2$.

Used refrigerant from the flue gas chiller 260, the first $CO_2$ condenser 264 and the second $CO_2$ condenser 270 is returned to the multistage compressor 252 for recompression and use for further cooling of the flue gas stream. The used refrigerant from the flue gas chiller 260 at a pressure P1, for example about 5 bar, is forwarded to a first compression stage 252' of the multistage compressor 252 suitable for receiving refrigerant at a pressure of P1. The used refrigerant from the first $CO_2$ condenser 264 at a pressure P2, for example about 2.7 bar, is forwarded, optionally via a refrigerant compressor suction drum 256, to a second compression stage 252" of the multistage compressor 252 suitable for receiving refrigerant at a pressure of P2. The used refrigerant from the second $CO_2$ condenser 270 at a pressure P3, for example about 1 bar, is forwarded, optionally via a refrigerant compressor suction drum 257, to a third compression stage 252''' of the multistage compressor 252 suitable for receiving refrigerant at a pressure of P3. The used refrigerant streams are then recompressed in the multistage compressor 252 to pressure P0 and reused in the refrigeration circuit.

Advantages of embodiments described hereinabove include:
1) Lower energy consumption as compared to conventional refrigerated $CO_2$ separation systems.
2) Allows use of simple, robust heat exchanger designs and materials that are robust against fouling and corrosion.

3) No flue gas polishing equipment necessary for process reasons.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A refrigeration system for condensation of carbon dioxide ($CO_2$) in a flue gas stream, said refrigeration system comprising:
    a refrigeration circuit containing a refrigerant, said refrigeration circuit comprising: a multistage refrigerant compressor,
    a refrigerant condenser,
    a refrigerant chiller,
    a flue gas chiller,
    a first $CO_2$ condenser, and
    a second $CO_2$ condenser,
    wherein
        the multistage refrigerant compressor is configured to compress the refrigerant from the flue gas chiller, first $CO_2$ condenser, and second $CO_2$ condenser to a pressure $P0$;
        the refrigerant condenser is configured to condense the compressed refrigerant;
        the refrigerant chiller is configured to chill at least a portion of the condensed refrigerant using liquid $CO_2$ separated in the first and/or second $CO_2$ condenser;
        the flue gas chiller is configured to chill the flue gas stream using a first portion of the chilled condensed refrigerant at a first expansion pressure $P1$ which is lower than the pressure $P0$;
        the first $CO_2$ condenser is configured to condense and separate a first portion of $CO_2$ from the chilled flue gas stream using a second portion of the chilled condensed refrigerant at a second expansion pressure $P2$ which is lower than the first expansion pressure $P1$;
        the second $CO_2$ condenser is configured to condense and separate a second portion of $CO_2$ from the chilled flue gas stream using a third portion of the chilled condensed refrigerant at a third expansion pressure $P3$ which is lower than the second expansion pressure $P2$; and
        the refrigerant chiller is configured to distribute the chilled condensed refrigerant as the first portion of the chilled condensed refrigerant provided to the flue gas chiller, the second portion provided to the first $CO_2$ condenser, and the third portion provided to the second $CO_2$ condenser in parallel.

2. The refrigeration system according to claim 1, said refrigeration circuit further comprising
    a first auxiliary refrigerant chiller configured to further chill the second portion of the chilled condensed refrigerant using liquid $CO_2$ separated in the first $CO_2$ condenser, before the refrigerant is used in the first $CO_2$ condenser,
    and/or
    a second auxiliary refrigerant chiller configured to further chill the third portion of the chilled condensed refrigerant using liquid $CO_2$ separated in the second $CO_2$ condenser, before the refrigerant is used in the second $CO_2$ condenser.

3. The refrigeration system according to claim 1, wherein each portion of the refrigerant from the flue gas chiller, the first $CO_2$ condenser, and the second $CO_2$ condenser respectively, are subsequently fed to a suitable compression stage of the multistage refrigerant compressor and recompressed to the pressure $P0$.

4. The refrigeration system according to claim 1, said refrigeration circuit further comprising
    a heat exchanger configured to cool at least a portion of the condensed refrigerant using a $CO_2$ depleted flue gas from the second $CO_2$ condenser.

5. The refrigeration system according to claim 1, further comprising a flue gas treatment system for removing carbon dioxide ($CO_2$) from a flue gas stream, the flue gas treatment system comprising:
    a flue gas compressor,
    a flue gas adsorption drier,
    wherein the flue gas chiller is arranged between the flue gas compressor and the flue gas adsorption drier, and the first $CO_2$ condenser and second $CO_2$ condenser are arranged in series downstream of the flue gas adsorption drier.

6. The flue gas treatment system according to claim 5, said system further comprising
    a first auxiliary refrigerant chiller configured to further chill the second portion of the chilled condensed refrigerant using liquid $CO_2$ separated in the first $CO_2$ condenser, before the refrigerant is used in the first $CO_2$ condenser,
    and/or
    a second auxiliary refrigerant chiller configured to further chill the third portion of the chilled condensed refrigerant using liquid $CO_2$ separated in the second $CO_2$ condenser, before the refrigerant is used in the second $CO_2$ condenser.

7. The flue gas treatment system according to claim 5, said system further comprising
    a heat exchanger configured to cool at least a portion of the condensed refrigerant using a $CO_2$ depleted flue gas from the second $CO_2$ condenser.

8. The flue gas treatment system according to claim 5, said system further comprising
    a first heat exchanger configured to cool at least a portion of the condensed refrigerant using a $CO_2$ depleted flue gas from the second $CO_2$ condenser,
    a second heat exchanger configured to reheat the $CO_2$ depleted flue gas from the first heat exchanger using warm flue gas from the flue gas compressor,
    a flue gas expander configured to expand the reheated compressed $CO_2$ depleted flue gas from the second heat exchanger, and
    a third heat exchanger configured to further cool the condensed refrigerant from the first heat exchanger using the using the $CO_2$ depleted flue gas from the flue gas expander.

9. The flue gas treatment system according to claim 5, comprising an auxiliary refrigerant chiller configured to chill a first portion of the condensed refrigerant using liquid $CO_2$ separated in the first and/or second $CO_2$ condenser, and a heat exchanger configured to cool a second portion of the condensed refrigerant using a $CO_2$ depleted flue gas from the second $CO_2$ condenser.

10. The flue gas treatment system according to claim 5, comprising an auxiliary refrigerant chiller configured to chill a first portion of the condensed refrigerant using liquid $CO_2$ separated in the first and/or second $CO_2$ condenser, a first heat exchanger configured to cool a second portion of the condensed refrigerant using a $CO_2$ depleted flue gas from the second $CO_2$ condenser, a second heat exchanger configured to reheat the $CO_2$ depleted flue gas from the first heat exchanger using warm flue gas from the flue gas compressor, a flue gas expander configured to expand the reheated compressed $CO_2$ depleted flue gas from the second heat exchanger, and a third heat exchanger configured to cool a third portion of the condensed refrigerant using the using the $CO_2$ depleted flue gas from the flue gas expander.

11. The refrigeration system according to claim 5, wherein said flue gas treatment system further comprises:

a flue gas condenser for removal of water vapor from the flue gas stream, wherein the flue gas condenser is arranged upstream of the flue gas compressor with reference to the general flow direction of the flue gas stream.

12. The flue gas treatment system according to claim 5, said system further comprising a selective catalytic reduction (SCR) unit for removal of nitrogen oxides (NOx) from the flue gas stream, arranged downstream of the second $CO_2$ condenser with reference to the general flow direction of the flue gas stream.

13. The refrigeration system according to claim 1, wherein the multistage refrigerant compressor further comprises:

an intercooling unit, downstream of one or more compression stages of the multistage refrigerant compressor.

14. The refrigeration system according to claim 1, wherein said refrigerant is at least one of propane and propylene.

15. The refrigerant system according to claim 1, further comprising a selective catalytic reduction (SCR) unit for removal of nitrogen oxides from the flue gas stream by selective catalytic reduction to nitrogen (N2), arranged downstream of the second $CO_2$ condenser with reference to the general flow direction of the flue gas stream.

* * * * *